United States Patent [19]
Shono et al.

[11] Patent Number: 5,485,284
[45] Date of Patent: Jan. 16, 1996

[54] IMAGE PROCESSING SYSTEM FOR PERFORMING COLOR IMAGE DATA CALIBRATION

[75] Inventors: Seita Shono, Warabi; Akihiro Usami, Yokohama, both of Japan

[73] Assignee: Canon Kabushiki Kaisha, Tokyo, Japan

[21] Appl. No.: 998,863

[22] Filed: Dec. 30, 1992

[30] Foreign Application Priority Data

Jan. 6, 1992 [JP] Japan ..................................... 4-000112
Feb. 13, 1992 [JP] Japan ..................................... 4-026424

[51] Int. Cl.⁶ ............................... H04N 1/56; H04N 1/60
[52] U.S. Cl. ........................... 358/504; 358/518; 358/519; 358/520; 358/523; 382/167
[58] Field of Search ..................... 354/518, 520, 354/523, 519, 504; 382/167

[56] References Cited

U.S. PATENT DOCUMENTS

4,751,535 6/1988 Myers ....................................... 358/520
4,941,038 7/1990 Walowit ................................... 358/504

*Primary Examiner*—Scott A. Rogers
*Attorney, Agent, or Firm*—Fitzpatrick, Cella, Harper & Scinto

[57] ABSTRACT

An image reading apparatus measures, color by color, an average transmission-density signal based upon image information obtained from a color original through which light is transmitted, converts the measured average transmission-density signal of every color into a subject-lightness signal of every color, and effects a conversion into a reference color stimulus signal, which is indicated by the apex of a triangle substantially circumscribed by a spectrum locus of a predetermined chromaticity diagram, based upon the converted subject-lightness signal of every color.

18 Claims, 5 Drawing Sheets

REFERENCE COLOR
STIMULUS DATA

R ( 0.7347, 0.2653 )

G ( -0.0860, 1.0860 )

B ( 0.0957, -0.0314 )

IMAGE PROCESSING SYSTEM FOR PERFORMING COLOR IMAGE DATA CALIBRATION

BACKGROUND OF THE INVENTION

1. Field of the Invention

The present invention relates to an image processing apparatus and method for reading and recording an image, for example, by using a color expression known as "c-RGB" (colorimetric RGB).

2. Description of the Related Art

A newly developed method of expressing colors involves obtaining the apex of a triangle substantially circumscribed on the spectrum locus of a chromaticity diagram, and expressing color by a combination of reference color stimulus data indicated by this apex. This method shall be referred to as "c-RGB" hereinafter.

In a case where this method is applied to an apparatus for reading a color film, however, the color of a subject in photography cannot be reflected correctly for reasons such as a disruption in the color balance on the film due to the influence of the light source, etc., at the time of photography.

Further, in such a conventional color image processing apparatus, calibration is made in a signal form (RGB or YMCK) which is inherent to a color image reading unit or a color image recording unit. The calibration represents that a reading unit is corrected so that the signal obtained when a color of known color characteristics is read in the reading unit becomes an expected signal, and that a recording unit is corrected so that the color obtained when a predetermined signal is output to an image recording unit becomes an expected color.

However, the above color image processing apparatus has the problem that since calibration is made in a signal form inherent to the apparatus, when the reading unit and recording unit are replaced by another reading unit and recording unit, respectively, the color characteristics change.

In addition, if calibration is made for known NTSC (National Television System Committee) RGB signals, NTSC correction must be made by raising to 0.45 th power, and the operation is thus made troublesome. There is also the problem that since the range of colors which can be expressed is limited, the color reproducible range of all reading units and recording units cannot be expressed.

SUMMARY OF THE INVENTION

Accordingly, an object of the present invention is to provide an image reading apparatus in which the aforementioned drawbacks of the prior art can be eliminated.

Another object of the present invention is to provide an image reading apparatus in which a c-RGB signal having excellent color balance at all times can be obtained from a measured value of the average density of a film, irrespective of the type of film and the photographic conditions.

A further object of the present invention is to provide an image reading apparatus which performs highly precise color reproduction in conformity with the characteristics of a color film reader.

Still another object of the present invention is to provide an image reading apparatus comprising measuring means for measuring, color by color, a transmission-density signal based upon image information obtained from a color original through which light is transmitted, first converting means for converting the transmission-density signal of every color, which has been measured by the measuring means, into a subject-lightness signal of every color, and second converting means for effecting a conversion into a reference color stimulus signal, which is indicated by the apex of a triangle substantially circumscribed on a spectrum locus of a predetermined chromaticity diagram, based upon the subject-lightness signal of every color resulting from the conversion performed by the first converting means.

A further object of the present invention is to provide an image processing apparatus and method which will not produce quantization error by using a color space formed so as to be circumscribed by a spectrum locus, and which permit calibration to be separately made for an image reading unit and an image recording unit.

A still further object of the present invention is to provide an image processing apparatus and method which permit an increase in the precision of calibration of each of the image reading unit and the image recording unit.

Another object of the present invention is to provide an image processing method comprising the formation step of forming a color space so that a triangle formed by connecting the chromaticity points of the RGB primary colors on a xy chromaticity diagram is circumscribed by a spectrum locus of the chromaticity diagram, and the calibration step of calibrating an input/output system in accordance with the color space formed by the formation step.

A further object of the present invention is to provide an image processing method comprising the formation step of forming a color space so that a triangle formed by connecting the chromaticity points of the RGB primary colors on a xy chromaticity diagram is circumscribed by a spectrum locus of the chromaticity diagram, the first calibration step of calibrating a reading system in accordance with the color space formed in the formation step, and the second calibration step of calibrating a recording system using the reading system calibrated in the first calibration step.

A still further object of the present invention is to provide an image processing apparatus connected to an input/output unit, and comprising formation means for forming a color space so that a triangle formed by connecting the chromaticity points of the RGB primary colors on a xy chromaticity diagram is circumscribed by a spectrum locus of the chromaticity diagram, and calibration means for calibrating the input/output unit in accordance with the color space formed by the formation means.

A further object of the present invention is to provide an image processing apparatus comprising an input/output unit, formation means for forming a color space so that a triangle formed by connecting the chromaticity points of the RGB primary colors is circumscribed by a spectrum locus of the chromaticity diagram, and calibration means for calibrating the input/output unit in accordance with the color space formed by the formation means.

A further object of the present invention is to provide an image processing apparatus connected to a reading unit and a recording unit, and comprising formation means for forming a color space so that a triangle formed by connecting the chromaticity points of the RGB primary colors on a xy chromaticity diagram is circumscribed by a spectrum locus of the chromaticity diagram, first calibration means for calibrating the reading unit in accordance with the color space formed by the formation means, and second calibration means for calibrating the recording unit by using the reading unit calibrated by the first calibration means.

A further object of the present invention is to provide an image processing apparatus comprising reading and recording units, formation means for forming a color space so that a triangle formed by connecting the chromaticity points of the RGB primary colors on a xy chromaticity diagram is circumscribed by a spectrum locus of the chromaticity diagram, first calibration means for calibrating the reading unit in accordance with the color space formed in the formation means, and second calibration means for calibrating the recording unit by using the reading unit calibrated by the first calibration means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the invention will now be described in detail with reference to the accompanying drawings.

<First Embodiment>

The color-film reading apparatus of this embodiment utilizes the fact that the slope of a change in the density of a film with respect to the amount of exposure of the film to light is substantially constant from one film to another, and the apparatus has a construction for obtaining a c-RGB signal having excellent color balance at all times from a measured value of the average density of the film, irrespective of the type of film and the photographic conditions.

The construction of the apparatus will now be described in detail.

Figure 1:
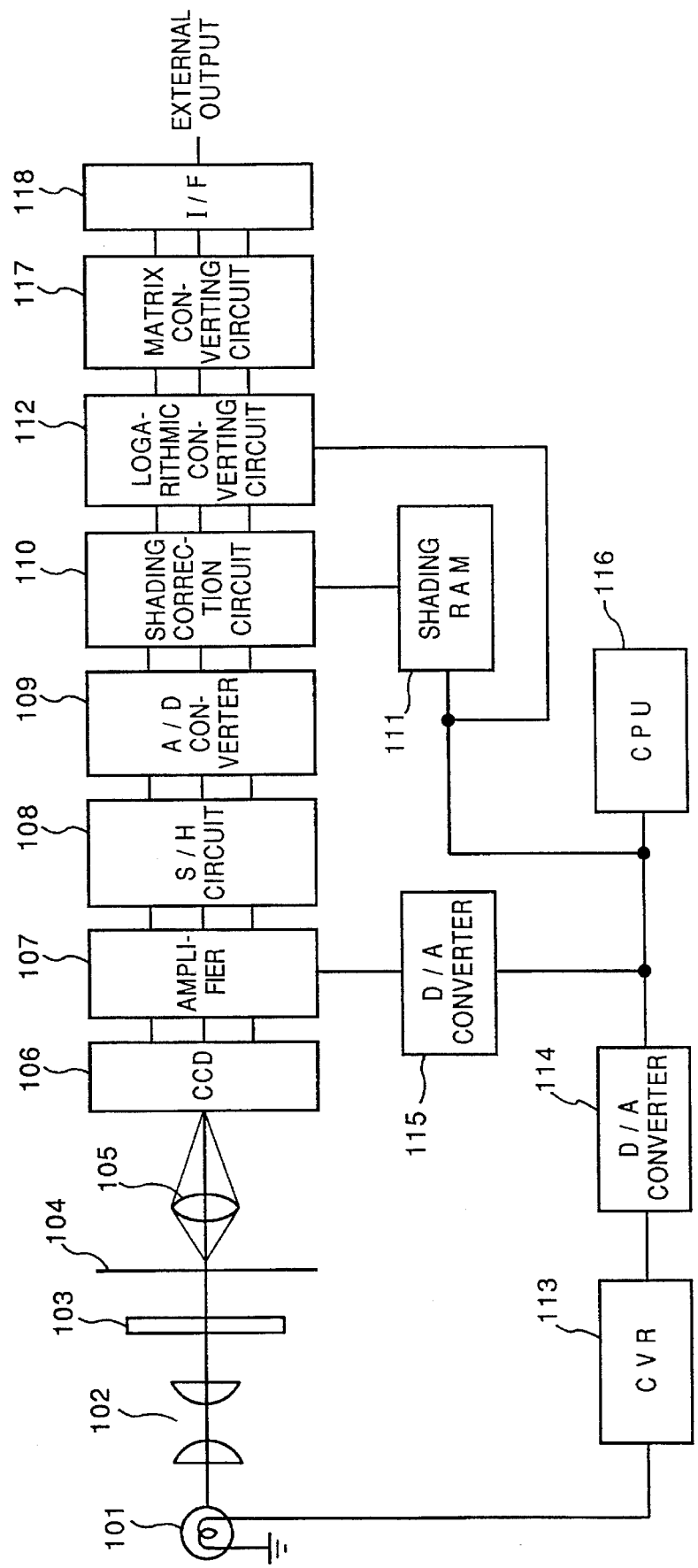
FIG. 1 is a block diagram illustrating the construction of a color-film reading apparatus according to a first embodiment of the present invention.

FIG. 1 is a block diagram illustrating the construction of a color-film reading apparatus according to a first embodiment of the present invention. Numeral 101 denotes a halogen lamp for transmissively illuminating film. The light from the lamp 101 is collimated and condensed by a condenser lens 102 before passing through a heat-preventing filter 103. Numeral 104 denotes a color film original that is to be read. The film image of the color film original 104 is formed by an image-forming lens 105, and the film image formed is converted into an electric signal by a photoelectric transducer 106. (In this embodiment, the photoelectric transducer 106 employs a three-line CCD line sensor, hereinafter referred to simply as a "CCD", in which the elements are coated with films of the three colors R, G and B.) An amplifier circuit 107 amplifies the RGB outputs of the CCD 106 in analog fashion, and the resulting analog outputs are sampled and held by a sample-and-hold (hereinafter referred to as "S/H") circuit 108. The analog outputs of the S/H circuit 108 are converted into digital signals by an analog/digital (hereinafter referred to as "A/D") converter 109. A shading correction circuit 110 corrects for irregularities in the sensitivity and illumination of the CCD 106. A shading RAM 111 holds correction data for the shading correction. One line each of the correction data is held with regard to each of the colors R, G, B. A logarithmic converting circuit 112 for logarithmically converting the RGB signals has a look-up table (hereinafter referred to as a "LUT") in which data is capable of being written from a CPU 116. A constant-voltage power supply (hereinafter referred to as a "CVR") 113 and a D/A converter 114 allow the ignition voltage of the light source 101 to be controlled by the CPU 116. A D/A converter 115 is for controlling the amplification factor of the amplifier 107 independently for each of the colors R, G, B. The CPU (central processing unit) 116 is connected to the logarithmic converting circuit 112 and to the D/A converters 114, 115 and transmits data to each of these circuits. A matrix converting circuit 117 converts the logarithmically converted signal from the converting circuit 112 into a c-RGB signal. Numeral 118 denotes an interface (hereinafter referred to as an "I/F") for delivering output signals. The arrangement is such that the color film original 104 is scanned in the direction of the arrow by a scanning mechanism (not shown) so that the entirety of the image is read.

By virtue of the arrangement described above, the average transmission density of the color film original 104 is measured, after which the CPU 116 executes prescribed processing. This is processing through which the R, G, B signals are made into ones proportional to the luminance of the subject, namely the reflectance of the subject. Subject reflectance r and subject density d are related by the equation d=−log r. If we let $r_{min}$ represent the reflectance of the darkest portion that is to be reproduced, the relation $d_{max}=$ −log $r_{min}$. Since the log of exposure E in an ordinary exposure region and the log of film transmittance T are linearly related, an equation of the minimum quantization error is expressed as follows:

$$d = d_{max} + (1/\gamma_i) \log T_i \qquad (1)$$

where i represents R, G, B, and γ (gamma) represents the slope of the straight line. When Equation (1) is used, γ can be found by the following equation:

$$r = r_{min}(T_i)^{-1/\gamma i} \qquad (2)$$

Here a LUT for realizing Equation (2) is written in the logarithmic converting circuit 112 in advance. Subject luminance information is reproduced using the LUT, after which a matrix conversion to the c-RGB signal is performed by the matrix converting circuit 117.

The operation of this embodiment will now be described.

Figure 2:
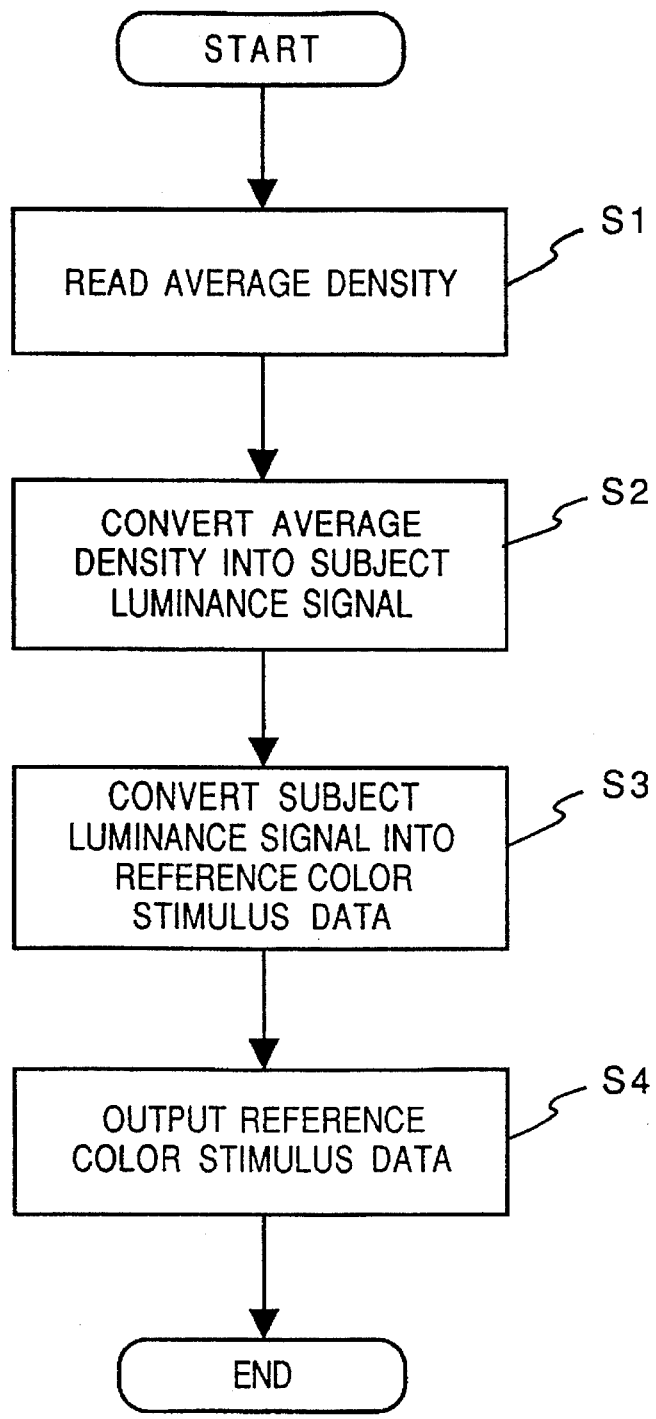
FIG. 2 is a flowchart for describing the control operation performed by a CPU according to the first embodiment of the invention.

FIG. 2 is a flowchart for describing the control operation performed by the CPU 116 according to the first embodiment. In the following, only the main processing is described. Each processing operation is performed by a corresponding circuit, and the CPU 116 controls the flow of the overall processing.

First, the average density of the color film is read by the CCD 106 at step S1, and then the average density is converted into the subject luminance signal by the logarithmic converting circuit 112 at step S2. Next, at step S3, the subject luminance signal is converted into reference color stimulus data, which is indicated by the apex of a triangle substantially circumscribed by a spectrum locus of a predetermined chromaticity diagram, by the matrix processing of the matrix converting circuit 117. The stimulus data obtained as a result of this processing is outputted via the I/F 118 at step S4.

Thus, in accordance with this embodiment as described above, color-separation signals having an excellent color balance at all times are obtained irrespective of the type of film and the degree of orange-masking. Moreover, the embodiment makes possible color reproduction in which the quantization error of digital processing is minimized.

<Second Embodiment>

In this embodiment, the matrix converting circuit for effecting the conversion to the c-RGB signal can be constructed as a LUT.

Figure 3:
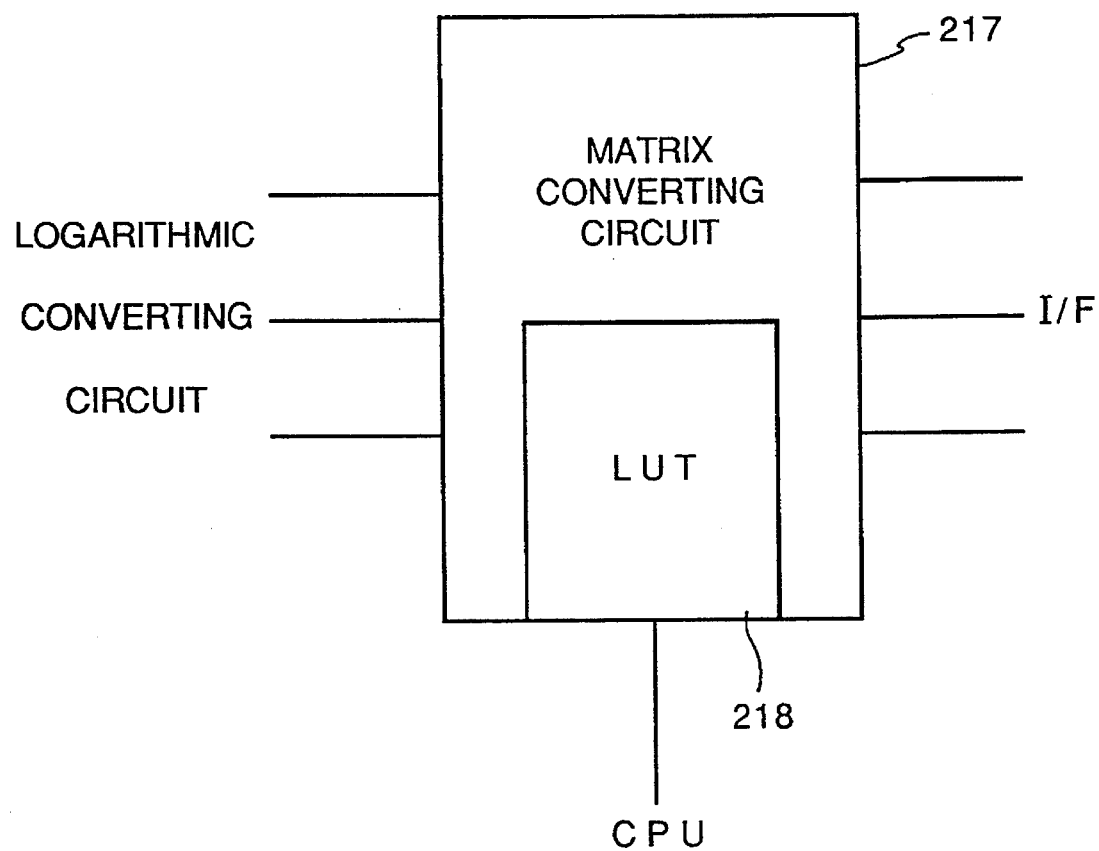
FIG. 3 is a block diagram showing the construction of the principal portion of a color-film reading apparatus according to a second embodiment of the present invention.

FIG. 3 illustrates the construction of the principal portion of the color film reading apparatus according to a second embodiment of the invention. Numeral 217 denotes a matrix converting circuit according to this embodiment. The converting circuit 217 has a LUT 218 in which data is capable of being written from a CPU, not shown.

The three-color separation system of the color film reading apparatus and the sensitivity characteristics of the film often are displaced from the color-matching function. In such case, it is impossible to perfectly perform the conversion into the c-RGB signal by means of a matrix conversion. For this reason, the characteristics of the color film reading apparatus are put into the form of a LUT in advance, thereby making possible highly precise color reproduction.

<Third Embodiment>

Figure 4:
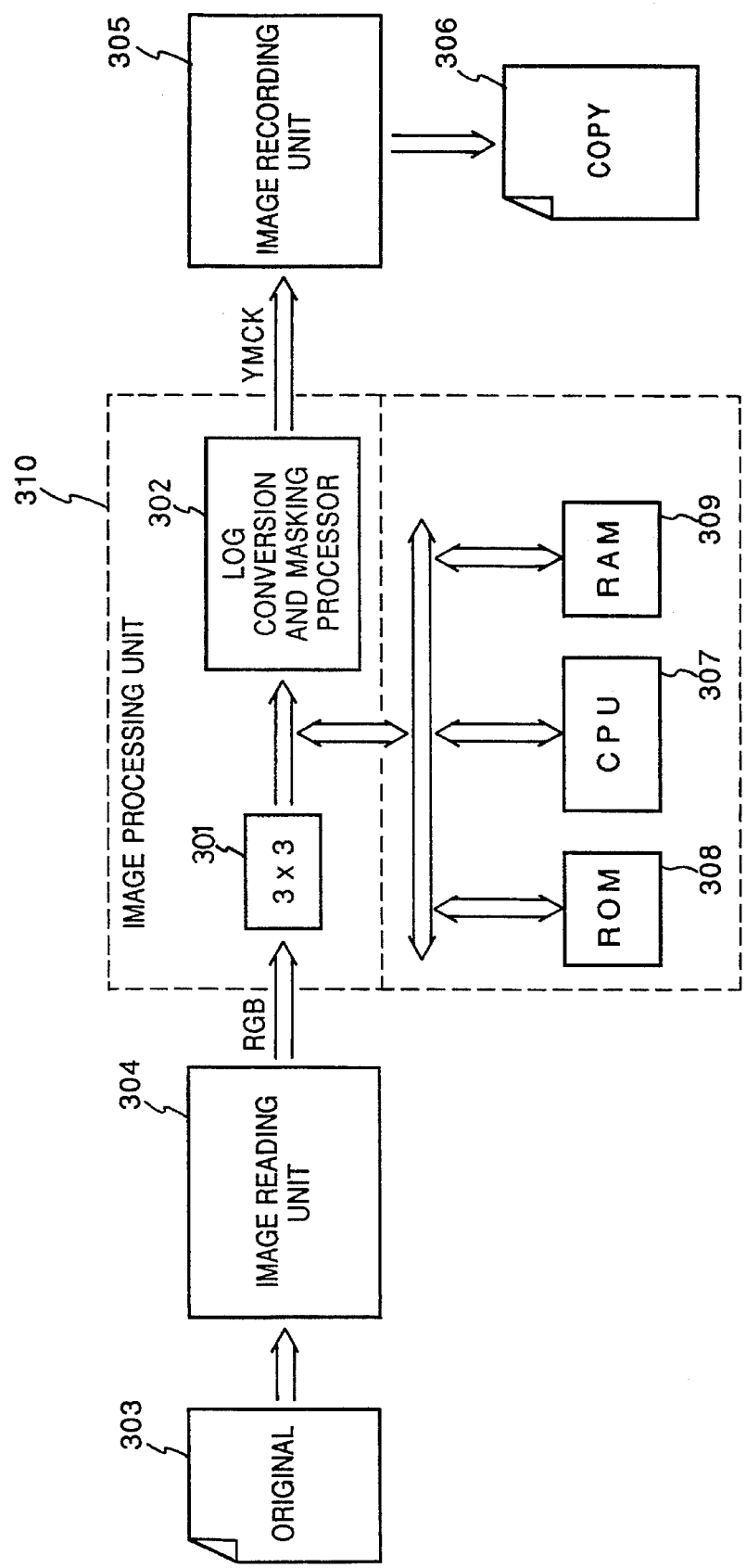
FIG. 4 is a block diagram illustrating the construction of an image processing apparatus according to a third embodiment of the invention.

FIG. 4 is a block diagram illustrating the construction of an image processing apparatus according to a third embodiment of the invention. As shown in FIG. 4, the image processing apparatus mainly comprises an image reading unit 304, an image processing unit 310 and an image recording unit 305. The whole system is controlled by a CPU 307. Reference numeral 303 denotes an original, and reference numeral 306 denotes a copy. The image processing unit 310 has a 3×3 matrix calculator 301 and a LOG 3×3 conversion and masking processor 302. Reference numeral 308 denotes a ROM for storing a program the CPU 7 executes, and reference numeral 309 denotes a RAM used as a working area for each of the programs.

Figure 5:
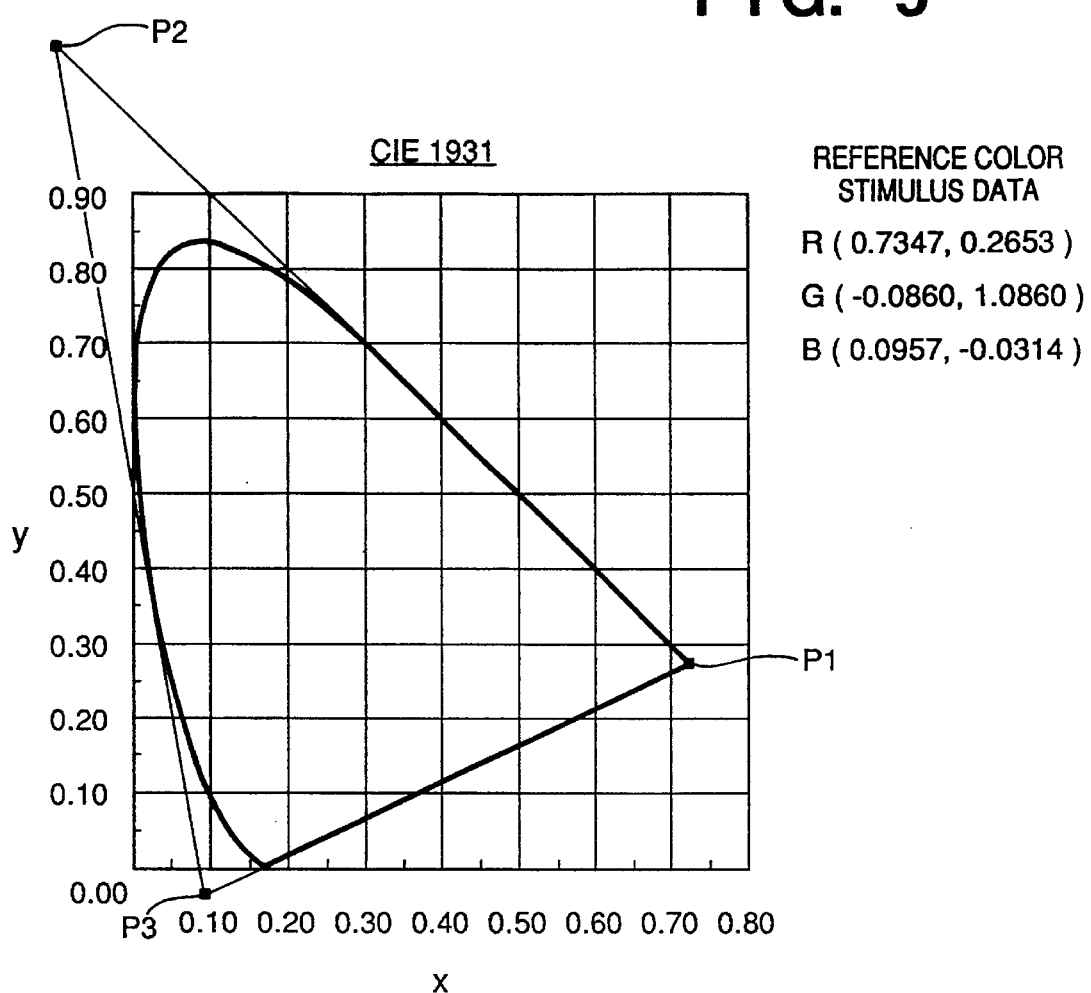
FIG. 5 is a xy chromaticity diagram corresponding to color space signals according to the third embodiment of the invention.
Figure 6:
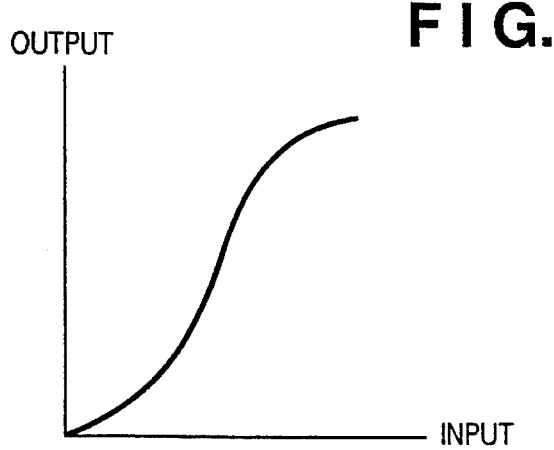
FIG. 6 is a drawing showing the characteristics of LUT (Look-Up Table) according to the third embodiment of the invention.

FIG. 5 is a xy chromaticity diagram corresponding to a color space signal according to the third embodiment, and FIG. 6 is a drawing showing the characteristics of a LUT (Look-Up Table) according to the third embodiment.

In this embodiment, the color space signal shown in the xy chromaticity diagram of FIG. 5 is generated between the 3×3 matrix calculator 301 and the LOG conversion and masking processor 302, both of which will be described below. The color space signal is defined as the c-RGB signal.

In the xy chromaticity diagram shown in FIG. 5, the positions P1, P2 and P3 at the apexes of a triangle are considered as the reference color stimulus positions. This embodiment employs a color expression method in which the stimulus positions on the xy coordinates are as follows:

R: (0.7347, 0.2653)

G: (−0.0860, 1.0860)

B: (0.0957, −0.0314)

The triangle formed by connecting these three positions substantially contacts the spectrum locus of the xy chromaticity diagram at wavelengths of about 505 nm and 525 nm, and substantially overlap the locus of pure purple formed by connecting 380 nm and 780 nm.

Namely, when the reference color stimulus positions are at the apexes of the triangle circumscribed by the spectrum locus of the chromaticity diagram so as to include the spectrum diagram, a color specification scheme using signals in which chromaticity values outside the spectrum locus, i.e., nonexistent colors, are eliminated as much as possible, can be obtained. The color matching functions are determined by the reference color stimuli, and the c-RGB signal value of a color each having the known color characteristics is determined by calculation using the matching function. This permits the calibration below.

In the apparatus shown in FIG. 4, color patches of plural colors each having the known color characteristics (spectral sensitivity, chromaticity) are read by the image reading unit 304. The 3×3 matrix coefficients are determined so that the signal value (A') obtained by processing the RGB signal in the 3×3 matrix processor 301 substantially agrees with the c-RGB signal (A) determined by the calculation using the matching functions. The calculation for determining the coefficients is made by the CPU 307. The signals A' and A are stored in the RAM 309. Alternatively, the signal A may be previously stored in the ROM 309. The coefficients are determined by a least square method or the like. The calculation using the color matching functions is described below. It is assumed that the spectral reflectance of the color patch is P(λ), the matching functions are r(λ), g(λ) and b(λ), the spectral distribution of a CIE (International Commission on Illumination) standard light source D65 is S(λ), and normalizing white color is W(λ), and a reflectance of about 70% to 90% is used. Assuming that the c-RGB values are R, G and B, the following equations are established:

$$R=255*\Sigma P(\lambda)*r(\lambda)*S(\lambda)*/\Sigma W(\lambda)*r(\lambda)*S(\lambda)$$

$$G=255*\Sigma P(\lambda)*g(\lambda)*S(\lambda)*/\Sigma W(\lambda)*g(\lambda)*S(\lambda)$$

$$G=255*\Sigma P(\lambda)*b(\lambda)*S(\lambda)*/\Sigma W(\lambda)*b(\lambda)*S(\lambda) \quad (3)$$

In the above equations (3), the coefficient 255 is applied to a 8 bit signal having gradation of 0 to 255, and Σ represents the sum of products of the wavelengths from 380 nm to 780 nm. The coefficient 255 is not limited to 8 bits, it may be applied to, for example, 16 bits other than 8 bits, and the range of Σ can also be variously changed.

In this way, the image reading unit 304 is calibrated.

The calibration of the image recording unit 305 is described below.

The combination (A) of the c-RGB signals of plural colors which are determined by the above calculation is input to the image recording unit 305, and a hard copy is output from the image recording unit 305. The spectral reflectance of the color of the hard copy is measured and is then substituted for P(λ) of the above equation (3) to determine each of the R, G and B values. If the combination of the thus-determined R, G, and B signal values is represented by H, the CPU 307 determines parameters of the LOG conversion and masking processor 302 so that the combination H is close to the combination A. The signal combinations H and A are stored in the ROM 309. The image recording unit 305 may be calibrated using any desired signal combination other than the combination A.

Denoting input as I, and output as θ, the LOG conversion is expressed by the following equation:

$$\theta = (-255/\Delta/D)\log I/255 \tag{4}$$

The RGB signals are converted into CMY signals by the LOG conversion. The masking represents that, for example, a 4×4 matrix operation is made using K and CMY values in the equation K=min(Y, M, C).

As described above, this embodiment uses as a color space for signals used for calibration the color space formed so that a triangle formed by connecting the chromaticity points of the primary colors on the xy chromatic diagram is circumscribed by the spectral locus, and the embodiment thus has the effect of enabling calibration usefully using color data with producing less color error.

A calibrated image reading unit 4 and a 3×3 matrix processor 1 may be employed for measuring colors.

Alternatively, when the image recording unit 5 is calibrated, a method in which 2 to 255 continuous gradation patterns of each of the colors YMCK are outputted, the output patterns are read by the image reading unit 4 and then the patterns are converted into c-RGB signals may be used for calibrating the gradation of each of the colors YMCK. In this case, a LUT (Look-Up Table) of each color having the characteristics shown in FIG. 6 may be used.

The order of the 3×3 matrix operation can be increased to 3×3 or more, and a LUT may be prepared for converting the output from the image reading unit into c-RGB signals. The LUT may also be used for converting the c-RGB signals into YMCK signals in the LOG conversion and masking processor.

As described above, the third embodiment uses as a color space of signals used for calibration the color space formed so that a triangle formed by connecting the chromaticity points of the primary colors on the xy chromaticity diagram is circumscribed by the spectrum locus, and thus has the effect of enabling calibration with high precision.

<Modification of Third Embodiment>

A modification of the third embodiment is described below. Since the components of an image processing apparatus according to this modified embodiment are the same as those of the image processing apparatus according to the above embodiment, the components are not described below and shown in the drawings.

In this modified embodiment, a 3×3 matrix is previously prepared in the image reading unit, and the output signals are converted into c-RGB signals by calibration. The LOG conversion and masking processor is incorporated into the image recording unit so that LOG conversion and masking are performed, and the LUT of gradation is determined by using the calibrated image reading unit. The calculation is performed by the CPU of the image reading unit or the image recording unit.

In addition, the quantization error of the signal values can be decreased by setting the white level to 75 to 90% which is the reflectance of usual white paper.

In the present invention, the masking may include processing such as UCR and employ black signals, or the masking and UCR may be separately performed. In addition, the order of making may be second or more.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A color image processing apparatus comprising:

obtaining means for obtaining color signal data corresponding to a predetermined color by using an input system, the color signal data being expressed by a combination of three stimulus data corresponding to vertices of a triangle which substantially contacts a spectrum locus of an xy chromaticity diagram at wavelengths of about 505 nm and 525 nm, and substantially overlaps the locus of a purple boundary formed by connecting 380 nm and 780 nm; and calibration means for calibrating the input system so that the color signal data is substantially equivalent to expected color signal data of the predetermined data.

2. A color image processing apparatus according to claim 1, wherein said input system has a reading unit.

3. A color image processing apparatus according to claim 1, wherein said obtaining means obtains the color signal data using a conversion matrix, and said calibrating means calibrates elements of the conversion matrix.

4. A color image processing method comprising the steps of:

obtaining color signal data corresponding to a predetermined color by using an input system, the color signal data being expressed by a combination of three stimulus data corresponding to vertices of a triangle which substantially contacts a spectrum locus of an xy chromaticity diagram at wavelengths of about 505 nm and 525 nm, and substantially overlaps the locus of a purple boundary formed by connecting 380 nm and 780 nm; and calibrating the input system so that the color signal data is substantially equivalent to expected color signal data of the predetermined color.

5. A color image processing method according to claim 4, wherein said input system is a reading system.

6. A color image processing method according to claim 4, wherein said obtaining step obtains the color signal data using a conversion matrix, and said calibrating step calibrates elements of the conversion matrix.

7. A color image processing method according to claim 4, wherein the three stimulus data are R: (0.7347, 0.2653), G: (−0.0860, 1.0860) and B: (0.0957, −0.0314) on the xy chromaticity diagram.

8. A color image processing apparatus comprising:

obtaining means for obtaining color signal data corresponding to a predetermined color, the color signal data being expressed by a combination of three stimulus data corresponding to vertices of a triangle which substantially contacts a spectrum locus of an xy chromaticity diagram at wavelengths of about 505 nm and 525 nm, and substantially overlaps the locus of a purple boundary formed by connecting 380 nm and 780 nm;

output means for outputting a color image in accordance with the color signal data using an output system; and calibration means for calibrating the output system so that the output color image is substantially equivalent to the predetermined color.

9. A color image processing apparatus according to claim 8, wherein said output system has a recording unit.

10. A color image processing apparatus according to claim 8, wherein said three stimulus data are R: (0.7347, 0.2653), G: (−0.0860, 1.0860) and B: (0.0957, −0.0314) on the xy chromaticity diagram.

11. A color image processing method comprising the steps of:
  obtaining color signal data corresponding to a predetermined color, the color signal data being expressed by a combination of three stimulus data corresponding to vertices of a triangle which substantially contacts a spectrum locus of an xy chromaticity diagram at wavelengths of about 505 nm and 525 nm, and substantially overlaps the locus of a purple boundary formed by connecting 380 nm and 780 nm;
  outputting a color image in accordance with the color signal data using an output system; and
  calibrating the output system so that the outputted color image is substantially equivalent to the predetermined color.

12. A color image processing method according to claim 11, wherein the output system is a recording system.

13. An image processing apparatus comprising:
  generating means for generating correction data for converting first color image data represented in a first color space, which depends on an image reading unit, to second color image data represented in a second color space, which is formed as a triangle on a xy chromaticity diagram, said triangle substantially contacting a spectrum locus of the xy chromaticity diagram at wavelengths of about 505 nm and 525 nm, and substantially overlapping the locus of a purple boundary formed by connecting 380 nm and 780 nm;
  input means for inputting first color image data in the first color space from the image reading unit;
  conversion means for converting the first color image data to second color image data in the second color space based on the correction data generated by said generating means.

14. An image processing apparatus according to claim 13, wherein said generating means generates correction data based on third color image data and fourth color image data, wherein the third color image data is represented in the first color space and obtained by reading an original image using the image reading unit, and the fourth color image data represents the original image in the second color space.

15. An image processing apparatus according to claim 13 wherein said converting means performs matrix operation.

16. An image processing method comprising the steps of:
  generating correction data for converting first color image data represented in a first color space, which depends on an image reading unit, to second color image data represented in a second color space, which is formed as a triangle on a xy chromaticity diagram, said triangle substantially contacting a spectrum locus corresponding to a real color region of the xy chromaticity diagram at wavelengths of about 505 nm and 525 nm, and substantially overlapping the locus of a purple boundary formed by connecting 380 nm and 780 nm;
  inputting first color image data in the first color space from the image reading unit;
  converting the first color image data to second color image data in the second color space based on the correction data generated in said generating step.

17. An image processing method according to claim 16, wherein the correction data is generated, in said generating step, based on third color image data and fourth color image data, wherein the third color image data is represented in the first color space and obtained by reading an original image using the image reading unit, and the fourth color image data represents the original image in the second color space.

18. An image processing method according to claim 16, wherein matrix operation is performed in said converting step.

* * * * *

UNITED STATES PATENT AND TRADEMARK OFFICE
CERTIFICATE OF CORRECTION

PATENT NO. : 5,485,284

DATED : January 16, 1996

INVENTORS : SEITA SHONO ET AL.

It is certified that error appears in the above-identified patent and that said Letters Patent is hereby corrected as shown below:

COLUMN 7

Equation "$\theta=(-255/\Delta/D)\log I/255\ldots(4)$ should read
--$\theta=(-255/\Delta D)\log I/255\ldots(4)$--.

COLUMN 9

Line 27, "on a" should read --on an--;
Line 35, "unit;" should read --unit; and--.

COLUMN 10

Line 8, "claim 13" should read --claim 13,--;
Line 15, "on a" should read --on an--;
Line 23, "unit;" should read --unit; and--.

Signed and Sealed this

Fourth Day of June, 1996

Attest:

BRUCE LEHMAN

*Attesting Officer*  *Commissioner of Patents and Trademarks*